US007637456B2

(12) United States Patent
Chavez et al.

(10) Patent No.: US 7,637,456 B2
(45) Date of Patent: Dec. 29, 2009

(54) POWER STARTER FOR MICRO AIR VEHICLES

(75) Inventors: Joey N. Chavez, Rio Rancho, NM (US); Paul J. Cruz, Los Lunas, NM (US)

(73) Assignee: Honeywell International Inc., Morristown, NJ (US)

( * ) Notice: Subject to any disclaimer, the term of this patent is extended or adjusted under 35 U.S.C. 154(b) by 240 days.

(21) Appl. No.: 11/765,169

(22) Filed: Jun. 19, 2007

(65) Prior Publication Data

US 2008/0315041 A1 Dec. 25, 2008

(51) Int. Cl.
*B64B 1/24* (2006.01)

(52) U.S. Cl. ............... 244/53 A; 123/185.2; 123/185.3; 123/185.14

(58) Field of Classification Search ............... 244/53 A; 123/185.2, 185.3, 185.14, 185.12
See application file for complete search history.

(56) References Cited

U.S. PATENT DOCUMENTS 6,676,084 B2 * 1/2004 Asseline et al. ............. 244/152
6,782,863 B2 * 8/2004 Leasure et al. ........... 123/185.3
6,981,482 B2 * 1/2006 Tsunoda et al. .......... 123/185.3

* cited by examiner

*Primary Examiner*—J. Woodrow Eldred
(74) *Attorney, Agent, or Firm*—Ingrassia Fisher & Lorenz, P.C.

(57) ABSTRACT

A manual starter for an engine includes a main housing, an output shaft, a spring housing, a spring, and an attachment unit. The output shaft is disposed at least partially inside the main housing, and is configured to supply a starting torque to the engine. The spring housing is disposed in the main housing. This spring is disposed in the spring housing, and is configured to receive an initial force from a starter cord and to supply the starting torque to the output shaft. The attachment unit is configured to selectively couple the spring to the output shaft before the engine has started and decouple the spring from the output shaft after the engine has started.

20 Claims, 6 Drawing Sheets

POWER STARTER FOR MICRO AIR VEHICLES

STATEMENT REGARDING FEDERALLY SPONSORED RESEARCH OR DEVELOPMENT

This invention was made with Government support under contract number MDA972-01-9-0018 awarded by the Defense Advanced Research Processes Agency (DARPA). The Government has certain rights in this invention.

FIELD OF THE INVENTION

The present invention relates to micro air vehicles, and, more particularly, to an improved starter for micro air vehicles.

BACKGROUND OF THE INVENTION

Micro air vehicles and other unmanned aerial vehicles are of emerging importance today, particularly for military applications. For example, micro air vehicles can be valuable in providing reconnaissance without the need for human pilots. Micro air vehicles often include engines that are started using a manual starter assembly similar to those commonly used with commercial lawn mowers. However, in certain situations, the activation of such a starter assembly may require significant pull force, which may in turn result in unwanted movement of certain micro air vehicle components (e.g. a guidance system), and/or may result in wear on one or more components of the micro air vehicle.

Accordingly, there is a need for an improved starter assembly that requires a relatively lower pull force, and/or that results in reduced movement and/or reduced induced inertia on the engine. In addition, there is a need for such an improved starter assembly that does not rely on any external electrical power sources. There is also a need for such an improved starter assembly with a reduced weight. The present invention addresses one or more of these needs.

SUMMARY OF THE INVENTION

The present invention provides a manual starter for an engine. In one embodiment, and by way of example only, the manual starter comprises a main housing, an output shaft, a spring housing, a spring, and an attachment unit. The output shaft is disposed at least partially inside the main housing, and is configured to supply a starting torque to the engine. The spring housing is disposed in the main housing. This spring is disposed in the spring housing, and is configured to receive an initial force from a starter cord and to supply the starting torque to the output shaft. The attachment unit is configured to selectively couple the spring to the output shaft before the engine has started and decouple the spring from the output shaft after the engine has started.

In another embodiment, and by way of example only, the manual starter comprises a main housing, a starter cord, a spring housing, a drive assembly, a spring, an output shaft, and an attachment unit. The starter cord is disposed at least partially outside the main housing, and is configured to receive an initial force. The spring housing is disposed in the main housing. The drive assembly is disposed at least partially within the main housing, and is configured to transfer the initial force from the starter cord to the spring housing. The spring is disposed in the spring housing, and is configured to receive the initial force from the spring housing and to supply a starting torque for the engine. The output shaft is disposed at least partially inside the main housing, and is configured to receive the starting torque from the spring and to supply the starting torque to the engine. The attachment unit is configured to selectively couple the spring to the output shaft before the engine has started and to decouple the spring from the output shaft after the engine has started. The attachment unit comprises a pawl and a coupler. The pawl is coupled to the output shaft. The coupler is coupled to the spring, and is configured to be selectively engaged and disengaged to the pawl.

The invention also provides a micro air vehicle. In one embodiment, and by way of example only, the micro air vehicle comprises a main body, a plurality of electronic pods, an engine, and a manual starter system. The plurality of electronic pods are coupled to the main body. The engine is disposed in the main body, and is coupled to the plurality of electronic pods. The manual starter system comprises a main housing, a starter cord, a spring housing, a drive assembly, a spring, an output shaft, and an attachment unit. The starter cord is disposed at least partially outside the main housing, and is configured to receive an initial force. The spring housing is disposed in the main housing. The drive assembly is disposed at least partially within the main housing, and is configured to transfer the initial force from the starter cord to the spring housing. The spring is disposed in the spring housing, and is configured to receive the initial force from the spring housing and to supply a starting torque for the engine. The output shaft is disposed at least partially inside the main housing, and is configured to receive the starting torque from the spring and to supply the starting torque to the engine. The attachment unit is configured to selectively couple the spring to the output shaft before the engine has started and to decouple the spring from the output shaft after the engine has started. The attachment unit comprises a pawl and a coupler. The pawl is coupled to the output shaft. The coupler is coupled to the spring, and is configured to be selectively engaged and disengaged to the pawl.

Other independent features and advantages of the preferred manual starter assembly will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the described embodiment is not limited to use in conjunction with a particular type of device. Thus, although the present embodiment of the manual starter assembly is, for convenience of explanation, depicted and described as being implemented in a micro air vehicle, it will be appreciated that it can be implemented in various other types of vehicles, and in various other devices that implement an internal combustion engine.

Figure 1:
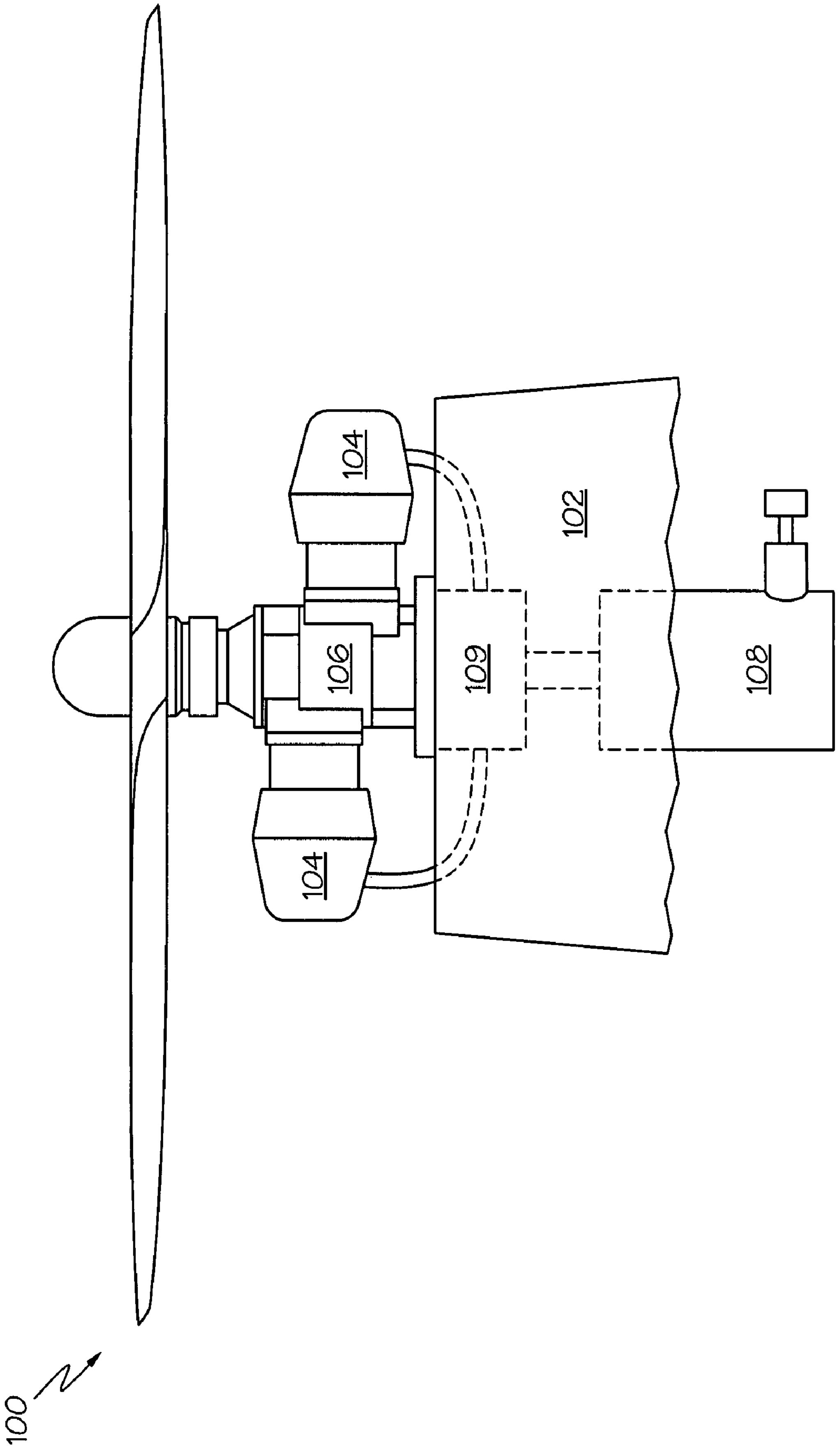
FIG. 1 is a plan view of an exemplary micro air vehicle.

FIG. 1 depicts an exemplary embodiment of a micro air vehicle 100. As depicted in FIG. 1, the micro air vehicle 100 includes a main body 102, a plurality of electronic pods 104, an internal combustion engine 106, a fan 109, and a manual starter assembly 108. The electronic pods 104 are coupled to the main body 102. It will be appreciated that the electronic pods 104 may take any one of a number of different embodiments.

The engine 106 is disposed in the main body 102, and is coupled to the electronic pods 104. The engine 106, once started, stimulates the flight of the micro air vehicle 100, for example through the activation of the fan 109 coupled thereto. The engine 106 is started by the manual starter assembly 108, which will be discussed in greater detail now below in connection with FIGS. 2 and 3. The engine 106 is preferably a two stroke gasoline engine, but this may vary. Similarly, the micro air vehicle 100 and various other components thereof may take any one of a number of different forms and configurations, each including a manual starter assembly 108.

Figure 2:
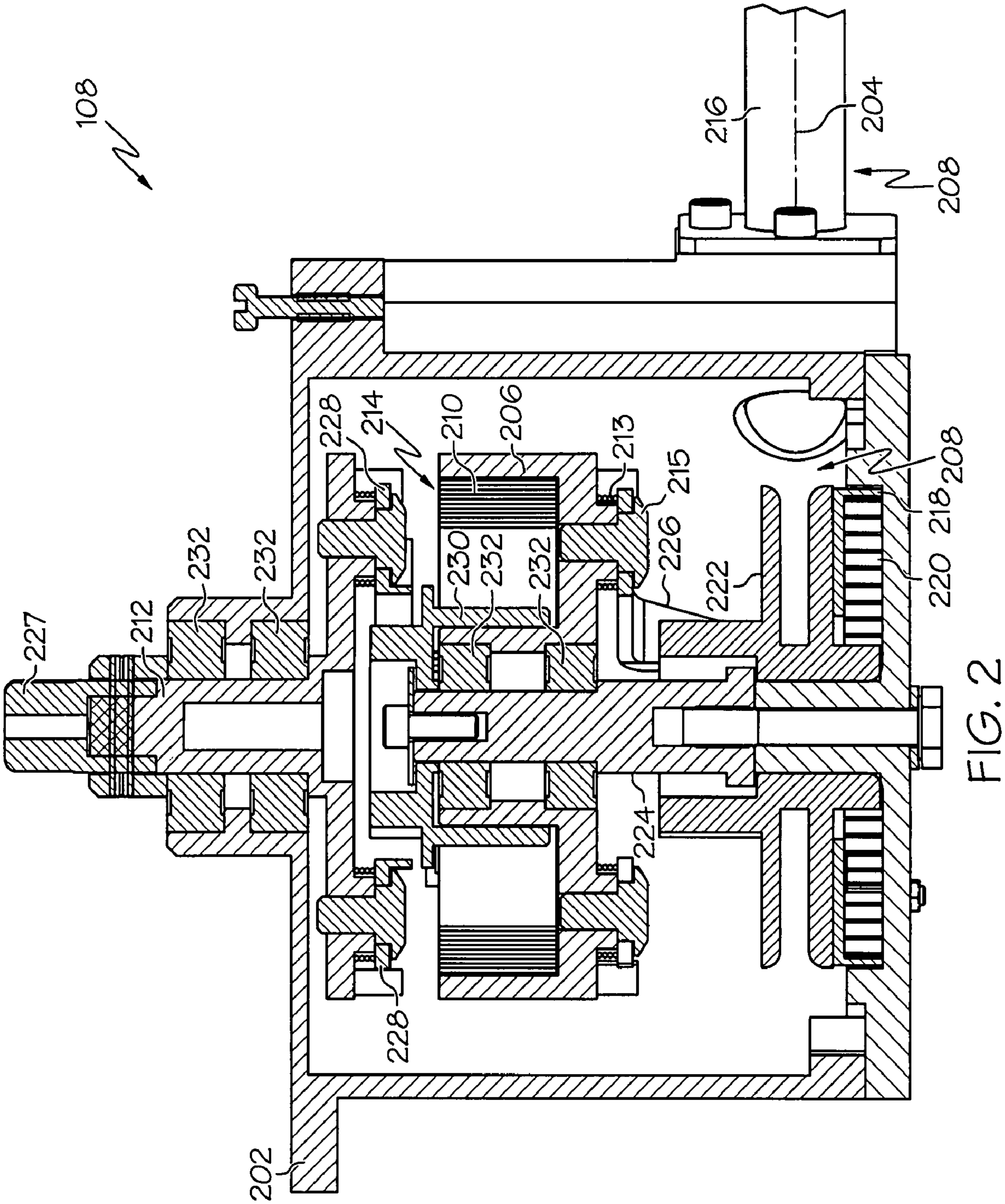
FIG. 2 is a simplified cross section view of an exemplary manual starter assembly that can be used in connection with the micro air vehicle of FIG. 1.
Figure 3:
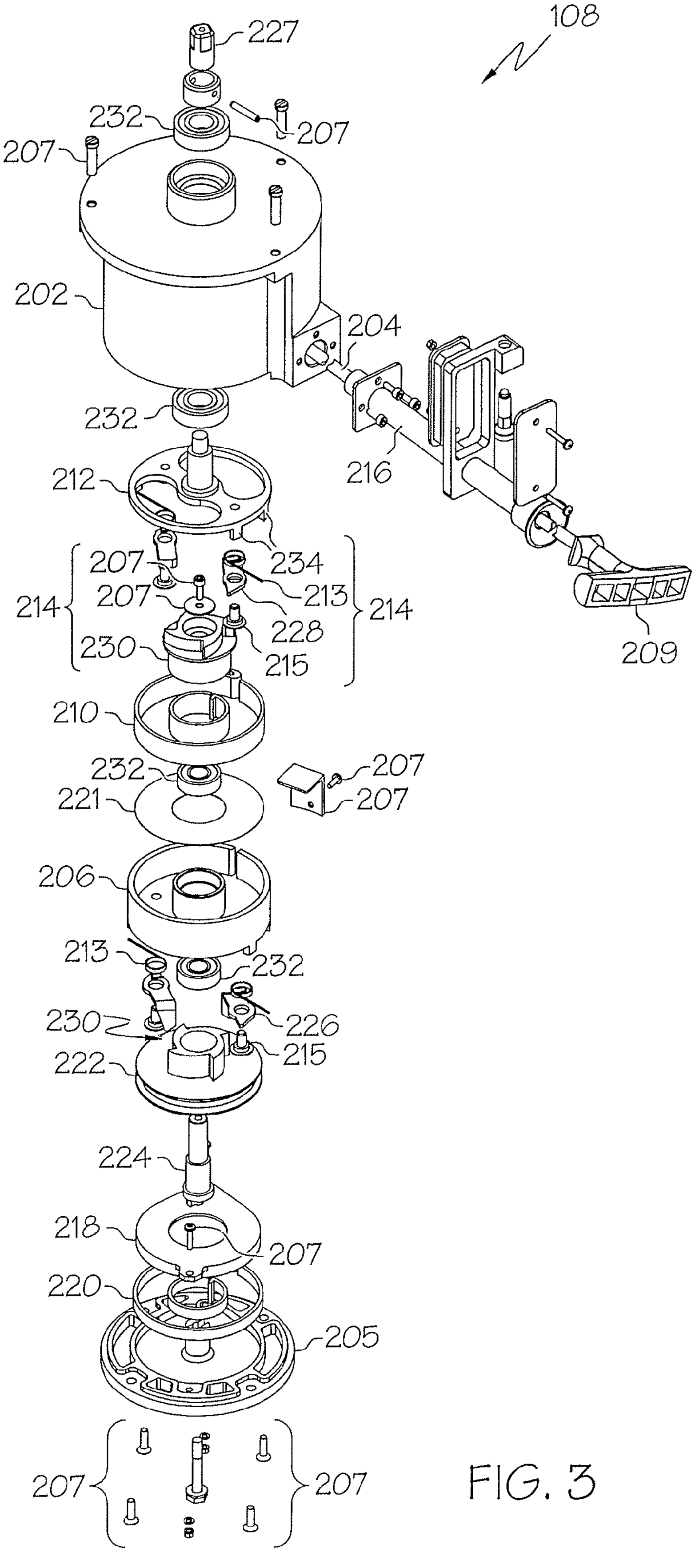
FIG. 3 is an exploded perspective view of the manual starter assembly of FIG. 2.

FIGS. 2 and 3 provide a simplified cross section view and an exploded perspective view, respectively, of an exemplary embodiment of the manual starter assembly 108 of the micro air vehicle 100. As shown in FIGS. 2 and 3, the manual starter assembly 108 includes a main housing 202, a starter cord 204, a power spring housing 206, a drive assembly 208, a power spring 210, and an output shaft 212. As shown in FIGS. 2 and 3, the manual starter assembly 108 can be held together by a base plate 205 and various fasteners 207, and may also include a handle 209. In one preferred embodiment, the drive assembly 208 and various other components of the manual starter assembly 108 are made of aluminum and delrin, an acetal plastic.

The starter cord 204 is disposed at least partially outside the main housing 202, and preferably inside a tube 216 that is coupled to the main housing 202. The power cord 204 is configured to receive an initial force from an individual or device (not depicted) for starting the engine 106, while the individual or device simultaneously holds onto at least a portion of the main body 102. In addition, a retraction spring housing 218 and a retraction spring 220 housed within the retraction spring housing 218, retract the starter cord 204 after a pull sequence in which the starter cord 204 receives an initial force. The power spring housing 206 is disposed in the main housing 202, and houses the power spring 210. The drive assembly 208 is also disposed at least partially within the main housing 202, and is configured to transfer the initial force from the starter cord 204 to the power spring 210.

In the depicted embodiment, the drive assembly 208 includes a pulley 222, an input shaft 224, one or more input pawls 226, an output shaft end 227, and one or more release pawls 228. The drive assembly may be considered to also include one or more of the starter cord 204, the power spring housing 206, the power spring 210, and the output shaft 212. The pulley 222 is coupled to the retraction spring 220, and to the power spring housing 206 via the input pawls 226, which are coupled to both the pulley 222 and the power spring housing 206. The input pawls 226 preferably each include a spring 213 (depicted in FIGS. 2 and 3) and a pin 215 (also depicted in FIG. 3) configured to hold the input pawls 226 against the pulley 222.

The power spring housing 206 is configured to rotate around the input shaft 224 upon receiving the initial force from the pulley 222 via the input pawls 226, and to thereby energize the power spring 210. This rotation of the power spring housing 206 is stabilized at least in part by a plurality of bearings 232, and a shim 221 helps to keep the power spring 210 from causing wear on the power spring housing 206 (see FIG. 3). The power spring 210 is disposed in the power spring housing 206, and is configured to receive the initial force therefrom, once the starting torque is transferred from the starter cord 204 to the power spring housing 206 via the drive assembly 208. Specifically, as will be described further below, as the power spring housing 206 rotates around the input shaft 224 following the pull of the starter cord 204, the power spring 210 is wound, and thereby energized. Additionally, as depicted in FIGS. 2 and 3, the bearings 232 form a high speed bearing interface to the output shaft 212, and also help to stabilize rotation of the output shaft 212.

The output shaft 212 is disposed at least partially inside the main housing 202, and includes an output shaft end 227 and one or more stops 234 for the release pawls 228 (see FIG. 3). The output shaft end 227 is configured to receive a holding force, for example from engine compression, during the initial stage of starting the engine 106. As will be described further below, once the power spring 210 is energized sufficiently to overcome the holding force applied to the output shaft end 227, the power spring 210 unwinds and transfers a starting torque to the output shaft 212. The output shaft 212 then rotates, and supplies the starting torque to the engine 106 via the output shaft end 227, thereby starting the engine.

The stops 234 on the output shaft 212 are configured to prevent release pawls 228 from rotating more than a predetermined angle following disengagement from the power spring 210, as will be shown in greater detail further below in FIG. 6. In a preferred embodiment, the stops 234 prevent the release pawls 228 from rotating more than thirty degrees after the release pawls 228 disengage from the coupler 230.

The attachment unit 214 includes a plurality of release pawls 228 and a coupler 230, and is configured to selectively couple the power spring 210 to the output shaft 212 before the engine 106 has started, and to decouple the power spring 210 from the output shaft 212 after the engine 106 has started. The release pawls 228 are each coupled to the output shaft 212, and selectively engage and disengage the coupler 230. Specifically, the release pawls 228 disengage the coupler 230 after the engine 106 has started, due to an increase in centrifugal force from the rotational speed of the engine 106, as will be described in greater detail further below in connection with FIGS. 4 and 5.

The coupler 230 is coupled to, and configured to interface with, each of the release pawls 228 and the power spring 210. The coupler 230 is configured to at least facilitate the selective coupling and separation of the power spring 210 and the power spring housing 206 from the output shaft 212. The coupler 230 is further configured to interface with the release pawls 228 to transfer torque, and to release the release pawls 228 at high rotational speeds, as will be described in greater detail further below in connection with FIGS. 4 and 5.

Figure 4:
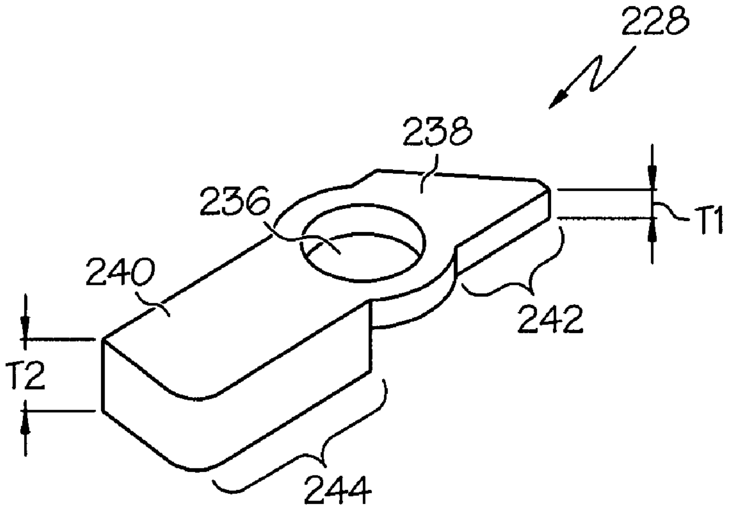
FIG. 4 is a close-up view of an exemplary release pawl that can be used in the manual starter assembly of FIGS. 2 and 3.
Figure 6:
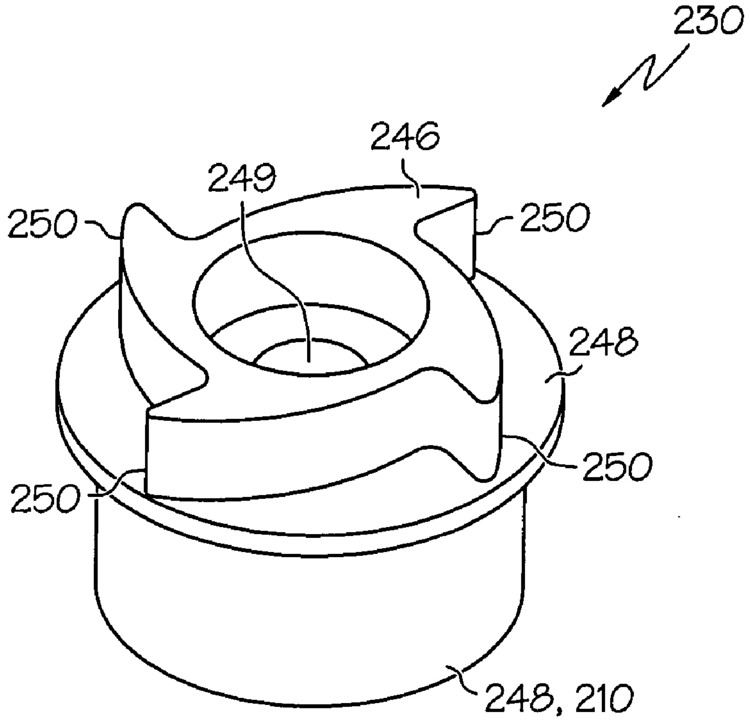
FIG. 6 is a close-up view of an exemplary coupler that can be used in the manual starter assembly of FIGS. 2 and 3, and used to mate with the release pawl of FIG. 4.
Figure 5:
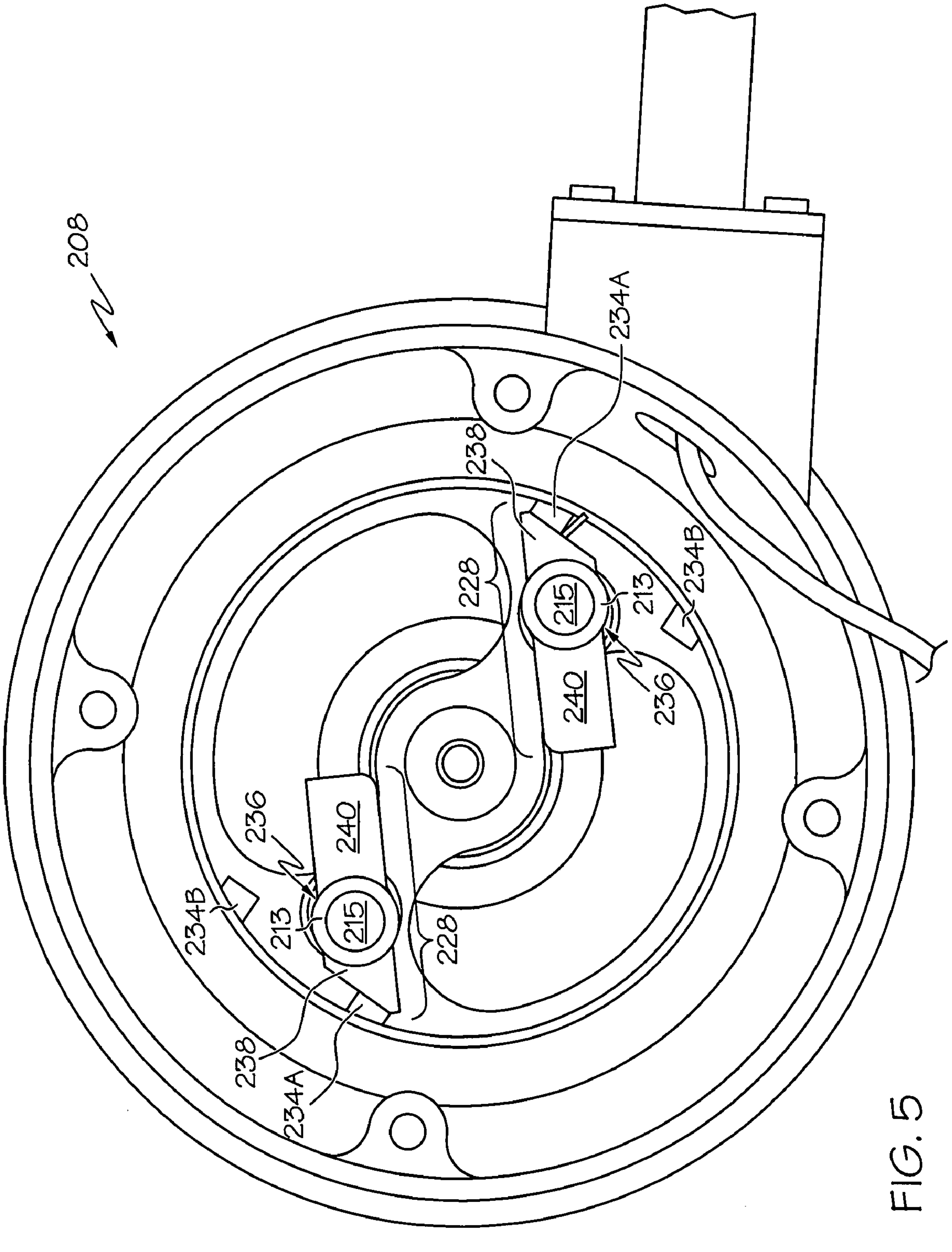
FIG. 5 is a section view of a portion of the manual starter assembly of FIGS. 2 and 3, shown disassembled, and featuring release pawls that can be used therein.
Figure 7:
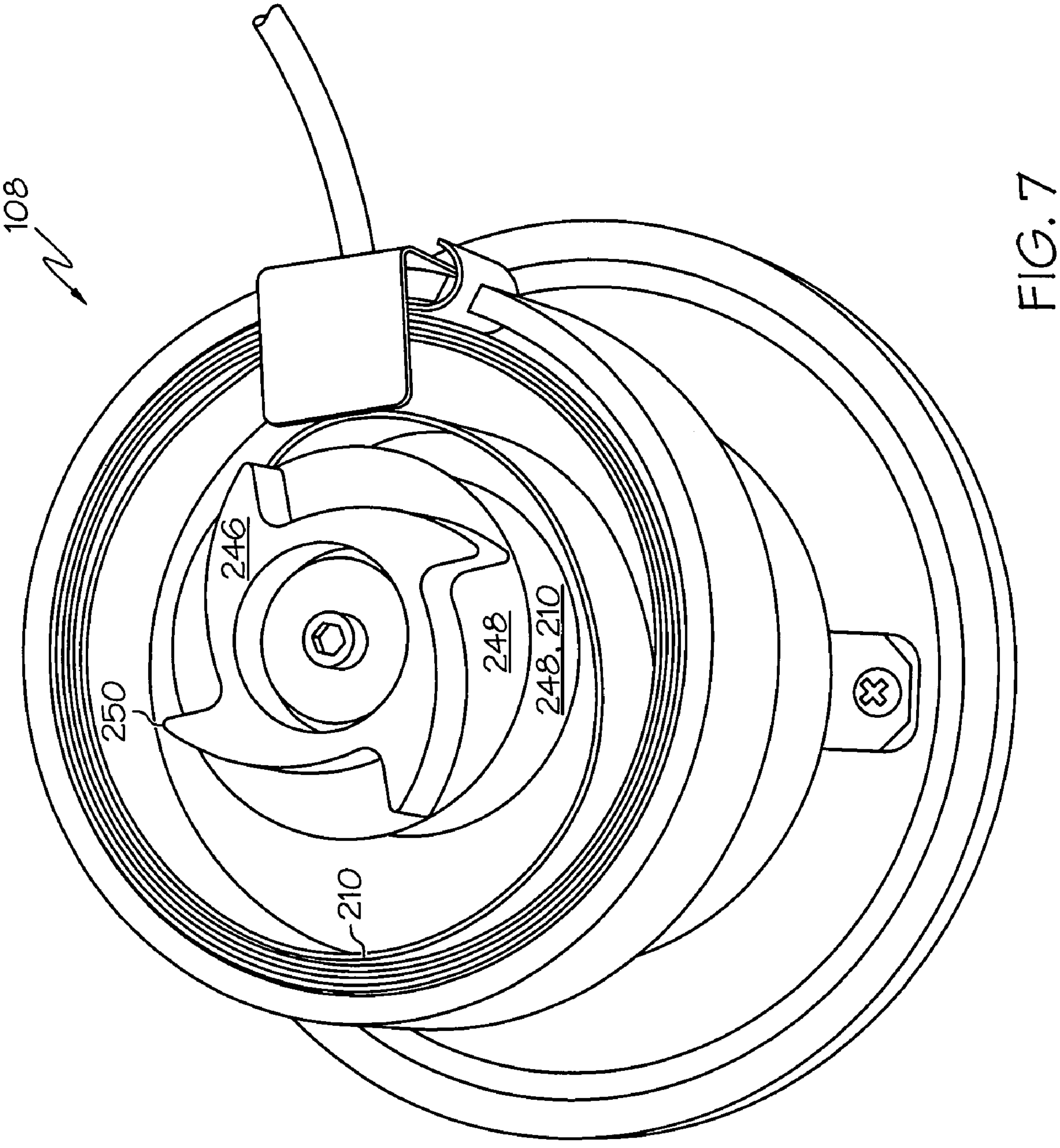
FIG. 7 is a section view of another portion of the manual starter assembly of FIGS. 2 and 3, shown disassembled, and featuring a coupler that can be used therein.

Turning now to FIGS. 4-7, close-up views are shown for an exemplary embodiment of the release pawls 228 and the coupler 230 as used in the attachment unit 214 of the depicted manual starter assembly 108. Specifically, FIG. 4 is a close-up view of an exemplary release pawl 228, FIG. 5 is a section view of a portion of the manual starter assembly 108 depicting the release pawls 228, FIG. 6 is a close-up view of an exemplary coupler 230, and FIG. 7 is a section view of another portion of the manual starter assembly 108 depicting the coupler 230 and the power spring 210 partially wound therearound.

As depicted in FIGS. 4 and 5, each release pawl 228 preferably includes a first portion 238, a second portion 240, and an opening 236 disposed at least partially therebetween. The opening 236 is configured to have a spring 213 (depicted in FIG. 5) held therein by a pin 215 (also depicted in FIG. 5). The first portion 238 is disposed on a first side 242 of the opening 236. The first portion 238 has a thickness T1, and a weight W1. The second portion 240 is disposed on a second side 244 of the opening 236, opposite the first side 242. The second portion 240 has a thickness T2 that is greater than T1, and has a resulting weight W2 that is greater than W1. As will be described further below, this asymmetrical distribution of weight facilitates the separation of the release pawls 228 (and thereby the output shaft 212) from the coupler 230 (and thereby the power spring 210) after the engine 106 has started by enabling the inertia of mass of the release pawls 228 once the engine 106 is rotating at a sufficient speed.

As shown in FIG. 5, preferably the first portion 238 initially rests against a first stop 234A on the output shaft 212 prior to rotation of the output shaft 212. Once the output shaft 212 rotates with sufficient velocity, the release pawl 228 rotates up to thirty degrees, at which point the second portion 240 rests against a second stop 234B.

As shown in FIGS. 6 and 7, the coupler 230 includes a top portion 246 and a bottom portion 248. The top portion 246 mates with the release pawls 228. In the depicted embodiment the top portion 246 resembles a star shape with four protruding edges 250. Each protruding edge 250 at least partially defines a mating region whereby the coupler 230 mates with a respective release pawl 228. However, the number of protruding edges 250, and the shape and configuration thereof, may vary, as may other features of the top portion 246. For example, the top portion 246 may take any one of a number of different shapes and configurations, and may include any one or more of a number of different mechanisms or parts for mating with the release pawls 228.

The bottom portion 248 is configured to mate with the power spring 210, preferably at least in part by having the power spring 210 wrap around the bottom portion 248 (see FIG. 7), preferably with a slot that captures an internal spring leg (not depicted in FIG. 7). In the depicted embodiment the bottom portion 248 is at least partially cylindrical in shape; however, the bottom portion 248 may also take any one of a number of different shapes.

Having now described the structural features of the manual starter assembly 108, the operation of an exemplary embodiment of the manual starter assembly 108 will now be described. For a user, the operation of the manual starter assembly 108 feels similar to pulling the cord on a commercial lawn mower, but with a relatively lower pull force. Once the end of the output shaft end 227 is interfaced with the output shaft 212 of the engine 106, the compression of the engine 106 thereby applies the above-mentioned holding force, thereby preventing rotation of the output shaft 212.

Once the starter cord 204 is pulled, the initial force is transferred to the power spring housing 206 via the drive assembly 208. Specifically, when the starter cord 204 is pulled, the retraction spring 220 is wound, and the starter cord 204 is at least partially unwound from the pulley 222. The pulley 222 rotates around the input shaft 224, thereby causing the input pawls 226 to rotate, and thereby causing the power spring housing 206 to rotate, around the input shaft 224. The starting torque is thus transferred from the pulley 222 to the power spring housing 206 via the input pawls 226. Preferably, the drive assembly 208 works similar to that of a commercial lawn mower.

The power spring housing 206 then rotates and winds the power spring 210. Meanwhile, the coupler 230, the release pawls 228, and the output shaft 212 are not yet rotating, due to the holding force exerted by the compression of the engine 106 interfacing with the output shaft end 227. During this time, the power spring 210 is energized in a direction opposing the holding force supplied by the engine compression through the interface with the output shaft end 227. The power spring 210 subsequently unwinds, or releases, once the power spring 210 is energized sufficiently to overcome the holding force applied by the engine compression.

Once the power spring 210 unwinds, it releases the starting torque, which turns the output shaft 212 and thereby starts the engine 106. Specifically, because the power spring 210 is coupled to the coupler 230, the coupler 230 rotates as the power spring 210 unwinds. The release pawls 228 at this point are engaged with the coupler 230, and similarly rotate. This in turn causes the output shaft 212 to spin, thereby starting the engine 106.

The power spring 210 and the power spring housing 206 are then disconnected from the output shaft 212, as the release pawls 228 disengage from the coupler 230. Specifically, the high rotational speed of the engine 106 after it is started causes the release pawls 228 to disengage from the coupler 230, utilizing the inertia of the mass of the release pawls 228. The stops 234 prevent the release pawls 228 from rotating more than thirty degrees following this disengagement, to minimize unnecessary movement and wear. Meanwhile, the output shaft 212 continues to spin while the engine 106 is running, but is now disconnected from the coupler 230, the power spring 210, and the power spring housing 206. Also, preferably at this point the input pawls 226 also disengage from the pulley 222 (see, e.g., the second coupler 230 depicted in FIG. 3), which in turn allows for the starter cord 204 to rewind onto the pulley 222.

Eventually, when the engine 106 stops, the release pawls 228 re-engage with the coupler 230, thereby reconnecting the output shaft 212 to the power spring 210 and the power spring housing 206. The manual starter assembly 108 is then ready for the next time that the engine 106 is to be started, at which point in time the process repeats.

The manual starter assembly 108 can be potentially advantageous in a number of different manners. For example, the disengagement feature of the release pawl 228 design potentially reduces wear on the drive assembly 208 and/or other components of the power spring housing 206, potentially reduces unwanted movement of micro air vehicle 100 components during the start-up process, and also reduces induced inertia loads on the engine 106. The starter hub can be easily removed from the engine interface regardless of whether the engine 106 is running or stopped, thereby allowing the micro air vehicle to be placed on the ground for launching or for storage and transporting. In addition, the manual starter assembly 108 is relatively light in weight, and does not rely on any external electrical power sources. The starting process for the engine 106 is also made easier by inducing a force exerted by the power spring 210 on the output shaft 212 that assists in overcoming the engine compression force. While a particular micro air vehicle 100 is depicted in FIG. 1, it will be appreciated that the manual starter assembly 108 can be used in connection with any one of a number of different micro air vehicles, any one of a number of other different types of vehicles, other vehicles, and/or any one of a number of other types of devices.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A manual starter system for an engine, the manual starter system comprising:
- a main housing;
- an output shaft disposed at least partially inside the main housing, the output shaft configured to supply a starting torque to the engine;
- a spring housing disposed in the main housing;
- a spring disposed in the spring housing, the spring configured to receive an initial force from a starter cord and to supply the starting torque to the output shaft;
- a first attachment unit configured to selectively couple the spring to the output shaft before the engine has started and decouple the spring from the output shaft after the engine has started;
- a rope pulley assembly disposed in the main housing; and
- a second attachment unit configured to selectively couple the rope pulley assembly to the output shaft before the engine has started and decouple the rope pulley assembly from the output shaft after the engine has started.

2. The manual starter system of claim 1, wherein the first attachment unit and the second attachment unit each comprises a plurality of pawls coupled to the output shaft.

3. The manual starter system of claim 2, wherein:
- the first attachment unit further comprises a coupler coupled to the spring and configured to be selectively engaged and disengaged to at least one of the plurality of pawls.

4. The manual starter system of claim 3, wherein the at least one of the plurality of pawls comprises:
- an opening configured to selectively engage the spring;
- a first portion on a first side of the opening, the first side having a thickness T1 and a weight W1; and
- a second portion on a second side of the opening, opposite the first side, the second portion having a thickness T2 that is greater than T1, and having a weight W2 that is greater than W1.

5. The manual starter system of claim 4, wherein the at least one of the plurality of pawls disengages from the coupler after the engine has started.

6. The manual starter system of claim 3, further comprising:
- a stop formed in the output shaft, the stop configured to prevent the at least one of the plurality of pawls from rotating more than a predetermined angle following disengagement from the coupler.

7. The manual starter system of claim 6, wherein the predetermined angle is approximately thirty degrees.

8. The manual starter system of claim 1, wherein the rope pulley assembly is configured to facilitate transfer of the initial force from the starter cord to the spring.

9. The manual starter system of claim 1, wherein the output shaft is configured to supply the starting torque to an engine for a micro air vehicle.

10. The manual starter system of claim 1, further comprising:
- a dual bearing interface for the output shaft.

11. A manual starter system for an engine, the manual starter system comprising:
- a main housing;
- a starter cord disposed at least partially outside the main housing, the starter cord configured to receive an initial force;
- a spring housing disposed in the main housing;
- a drive assembly disposed at least partially within the main housing and configured to transfer the initial force from the starter cord to the spring housing, the drive assembly comprising a rope pulley assembly disposed in the main housing;
- a spring disposed in the spring housing, the spring configured to receive the initial force from the spring housing and to supply a starting torque for the engine;
- an output shaft disposed at least partially inside the main housing, the output shaft configured to receive the staffing torque from the spring and to supply the starting torque to the engine;
- a first attachment unit configured to selectively couple the spring to the output shaft before the engine has started and to decouple the spring from the output shaft after the engine has started, the first attachment unit comprising:
  - a first pawl coupled to the output shaft; and
  - a first coupler coupled to the spring and configured to be selectively engaged and disengaged to the first pawl; and
- a second attachment unit configured to selectively couple the rope pulley assembly to the output shaft before the engine has started and decouple the rope pulley assembly from the output shaft after the engine has started, the second attachment unit comprising:
  - a second pawl coupled to the output shaft; and
  - a second coupler coupled to the rope pulley assembly and configured to be selectively engaged and disengaged to the second pawl.

12. The manual starter system of claim 11, wherein the first pawl comprises:
- an opening configured to selectively engage the spring;
- a first portion on a first side of the opening, the first side having a thickness T1 and a weight W1; and
- a second portion on a second side of the opening, opposite the first side, the second portion having a thickness T2 that is greater than T1, and having a weight W2 that is greater than W1.

13. The manual starter system of claim 12, wherein the first pawl disengages from the first coupler after the engine has started.

14. The manual starter system of claim 11, further comprising:
- a stop formed in the output shaft, the stop configured to prevent the first pawl from rotating more than a predetermined angle following disengagement from the first coupler.

15. The manual starter system of claim 14, wherein the predetermined angle is approximately thirty degrees.

16. The manual starter system of claim 1, wherein the output shaft is configured to supply the starting torque to an engine for a micro air vehicle.

17. A micro air vehicle comprising:
- a main body;
- a plurality of electronic pods coupled to the main body;
- an engine disposed in the main body and coupled to the plurality of electronic pods; and a manual starter system comprising:

a main housing;

a starter cord disposed at least partially outside the main housing, the starter cord configured to receive an initial force;

a spring housing disposed in the main housing;

a drive assembly disposed at least partially within the main housing and configured to transfer the initial force from the starter cord to the spring housing, the drive assembly comprising a rope pulley assembly disposed in the main housing;

a spring disposed in the spring housing, the spring configured to receive the initial force from the spring housing and to supply a starting torque for the engine;

an output shaft disposed at least partially inside the main housing, the output shaft configured to receive the starting torque from the spring and to supply the starting torque to the engine;

a first attachment unit configured to selectively couple the spring housing to the output shaft before the engine has started and to decouple the spring from the output shaft after the engine has started, the attachment unit comprising:

a first pawl coupled to the output shaft; and a first coupler coupled to the spring and configured to be selectively engaged and disengaged to the first pawl; and a second attachment unit configured to selectively couple the rope pulley assembly to the output shaft before the engine has started and decouple the rope pulley assembly from the output shaft after the engine has started, the second attachment unit comprising:

a second yawl coupled to the output shaft; and a second coupler coupled to the rope pulley assembly and configured to be selectively engaged and disengaged to the second pawl.

18. The micro air vehicle of claim 17, wherein the first pawl comprises:

an opening configured to selectively engage the spring;

a first portion on a first side of the opening, the first side having a thickness T1 and a weight W1; and a second portion on a second side of the opening, opposite the first side, the second portion having a thickness T2 that is greater than T1, and having a weight W2 that is greater than W1.

19. The micro air vehicle of claim 18, wherein the first pawl disengages from the first coupler after the engine has started.

20. The micro air vehicle of claim 18, further comprising:

a stop formed in the output shaft, the stop configured to prevent the first pawl from rotating more than a predetermined angle following disengagement from the first coupler.

* * * * *

UNITED STATES PATENT AND TRADEMARK OFFICE

CERTIFICATE OF CORRECTION

PATENT NO. : 7,637,456 B2
APPLICATION NO. : 11/765169
DATED : December 29, 2009
INVENTOR(S) : Chavez et al.

It is certified that error appears in the above-identified patent and that said Letters Patent is hereby corrected as shown below:

Column 10, line 6, "yawl" should be changed to --pawl--.

Signed and Sealed this
Tenth Day of May, 2011

David J. Kappos
*Director of the United States Patent and Trademark Office*